United States Patent [19]

Ishibashi et al.

[11] 4,118,341

[45] Oct. 3, 1978

[54] ACTIVATED CARBON

[75] Inventors: Katsuji Ishibashi, Sapporo; Shigeo Mitsui, Ebetsu; Rikio Kobayashi, Tokyo, all of Japan

[73] Assignee: Agency of Industrial Science & Technology, Tokyo, Japan

[21] Appl. No.: 784,947

[22] Filed: Apr. 5, 1977

Related U.S. Application Data

[63] Continuation-in-part of Ser. No. 562,248, Mar. 26, 1975, abandoned.

[30] Foreign Application Priority Data

May 27, 1974 [JP] Japan .................................. 49-59065

[51] Int. Cl.$^2$ ..................... B01J 27/20; B01J 27/24; B01J 21/18
[52] U.S. Cl. ................................ 252/438; 252/421; 252/444; 252/445; 264/29.1
[58] Field of Search ............... 252/414, 421, 438, 444, 252/426; 423/449, 448, 447, 447.7, 447.6; 526/341; 528/481; 264/29.2, 29

[56] References Cited

U.S. PATENT DOCUMENTS

| 3,632,798 | 1/1972 | Morita et al. ................... 528/481 X |
| 3,769,390 | 10/1973 | Weisbeck et al. ............ 423/447.7 X |
| 3,846,833 | 11/1974 | Ram et al. .............................. 526/341 |
| 3,937,439 | 2/1976 | Tyler et al. ....................... 252/421 X |
| 3,953,345 | 4/1976 | Saito et al. .............................. 252/521 |

FOREIGN PATENT DOCUMENTS 2,357,620 5/1974 Fed. Rep. of Germany ........... 252/438
4,930,627 3/1974 Japan.

OTHER PUBLICATIONS

Watt, W. et al., "The Effect of Length Changes During Oxidation of Polyacrylonitrile Fibers on the Young's Modulus of Carbon Fibers," Applied Polymer Symposia, No. 9, 215–227, (1969).

*Primary Examiner*—O. R. Vertiz
*Assistant Examiner*—Mark Bell
*Attorney, Agent, or Firm*—Kurt Kelman

[57] ABSTRACT

A method for the manufacture of an activated carbon by subjecting an acrylonitrile polymer to thermal condensation and activating the resultant condensation product and an activated carbon manufactured by said method. The activated carbon obtained is characterized by containing nitrogen in the molecular structure thereof and by having a high adsorbing capacity for mercaptan.

6 Claims, No Drawings

ACTIVATED CARBON

REFERENCE TO COPENDING APPLICATION

This is a continuation-in-part application of our copending application U.S. Ser. No. 562,248 filed Mar. 26, 1975, and now abandoned.

BACKGROUND OF THE INVENTION

This invention relates to a method for the manufacture of an activated carbon by using as the starting material therefor a polymer containing polyacrylonitrile and to an activated carbon manufactured by said method, which activated carbon contains nitrogen as part of the molecular structure thereof.

Textile products for clothes and the like which use, as their starting materials, polyacrylonitrile resins or copolymers of acrylonitrile are produced in great quantity and polyacrylonitrile-containing industrial wastes from their production processes occur in huge quantities. Heretofore, these industrial wastes have generally been disposed of by incineration. The activated carbon according to the present invention can easily be manufactured from these industrial wastes. Thus, the present invention offers an advantageous use for otherwise worthless industrial wastes.

As is universally known, when a polyacrylonitrile is heated to a temperature over 200° C. in the air, it first undergoes discoloration to a black shade and eventually converts itself into a thermally condensed (thermally decomposed) polymer having a structure containing therein a pyridine ring. This thermal condensation product offers resistance to heat and fire such that it remains intact even in a flame. It is known that when this product is left to stand in a flame for a long time, it remains incombustible, though it may suffer loss of strength. With a view to utilizing this thermal behavior to advantage, attempts have been made to manufacture a carbon fiber by heating this thermal condensation product to a temperature above 1000° C., preferably above 2000° C., in an inert gas such as nitrogen etc.

The carbon fiber thus produced contains little nitrogen (about 3% at the most) and is a graphite structure of small surface area which, although of high strength and elasticity, possesses little absorptivity.

In contrast, the activated carbons now in widespread use are manufactured by carbonizing vegetable substances, coal, animal bones, etc. and subsequently activating the carbonization products. Thus, they are substantially composed of carbon. They contain heteroatoms such as oxygen, nitrogen, sulfur and phosphorous only in negligible percentages. Negligible as their percentages may be, there is a possibility that these heteroatoms will have an appreciable effect on the properties of the activated carbons. This possibility is evidenced by a report that the activated carbon produced from bone black as the starting material exhibits a high adsorbing property for heavy metals because it contains phosphorus. It has also been established that any conventional activated carbon, when it is prepared so as to incorporate a nitrogen-containing compound, shows much greater adsorbing capacity for certain kinds of heavy metals than when it is prepared without such addition.

The present inventors noted and took special interest in the high thermal stability displayed by the thermal condensation product of polyacrylonitrile and copolymers thereof and have found that activation of this thermal condensation product brings about an activated carbon which is considerably useful, and consequently they have accomplished the present invention.

A primary object of the present invention is to provide an activated carbon which is produced from an acrylonitrile-containing polymer as the starting material and which, therefore, contains nitrogen in the molecular structure thereof and enjoys an outstanding capacity for adsorbing mercaptans in particular.

BRIEF SUMMARY OF THE INVENTION

This invention relates to a method for the manufacture of an activated carbon containing nitrogen as part of the molecular structure thereof and to an activated carbon manufactured by said method.

This nitrogen-containing activated carbon is manufactured from an acrylonitrile polymer of copolymer as the raw material by first heating said raw material in the air to obtain a thermal condensation product and subsequently activating the thermal condensation product by heating in steam, carbon dioxide or a mixture thereof at a temperature between 550° and 950° C. The composition of the product of the present invention is characterized in that it contains nitrogen while carbon makes up the greater part and hydrogen a minor part thereof. The nitrogen content of the product is variable with the particular kind of polymer used as the raw material, the conditions under which this raw material is heated for the formation of thermal condensation product, the conditions under which the condensation product is activated, etc. For the purpose of this invention, however, this nitrogen content is required to be not less than 0.5% by weight.

DETAILED DESCRIPTION OF THE INVENTION

The present invention originated in the observation that the theoretical nitrogen content of polyacrylonitrile was 26.40% and that of the polymer obtained as the thermal condensation product of polyacrylonitrile was 27.44% and the polymer is thermally stable. This observation led to an anticipation that a nitrogen-containing activated carbon produced from the polymer obtained by the thermal condensation of polyacrylonitrile ought to have a high capacity for adsorbing heavy metals. Encouraged by this anticipation, the inventors pursued research to find a method for the incorporation of nitrogen capable of adsorbing heavy metals. The present invention has been accomplished in consequence of this research.

In polyacrylonitrile, all the nitrogen exists in the C—N form. The inventors have discovered through an experiment that while the polyacrylonitrile contains nitrogen solely in the C—N form, the thermal condensation product obtained by treating the polyacrylonitrile in the air at 270° C. for 4 hours, for example, has a total nitrogen content of 23.12%, of which the N—H or N—C form nitrogen makes up 23% and the N—N form nitrogen makes up the balance 0.12%. This indicates that the thermal condensation brings into existence 0.12% of the N—N form nitrogen, though the percentage accounts for only 0.5% of the total nitrogen content. It is noted that the total nitrogen content of the thermal condensation product mentioned above is 4.32% less than is theoretically expected. A possible reason for this difference is that in the course of the thermal condensation, a reaction entailing denitrification occurs owing to a reaction entailing removal of hydrogen cyanide, depolymerization of polyacrylonitrile (toward formation of acrylonitrile monomer), oxidation, etc.

The thermal condensation product, when activated with steam at 850° for 25 minutes, results in an activated carbon containing nitrogen. Analysis for nitrogen reveals that this activated carbon has a total nitrogen content of 8.92%, of which the N—H or N—C form nitrogen makes up 4.87% and the N—N form nitrogen makes up 3.42%, indicating that the N—N form nitrogen increases to the extent of making up about 41% of the total nitrogen content, though the total nitrogen content falls to about one third of that of the polyacrylonitrile. The vigorous denitrification which occurs in the course of the activation with steam and the ammoniacal odor which emanates from the effluent gas in the course of activation both warrant the conclusion that the decrease of the nitrogen content mentioned above is ascribable to various complicated reactions such as the formation of amine due to the reduction of nitrile group with the nitrogen formed in the reaction of the formula:

$$H_2O + C_x \rightarrow H_2 + CO + C_{x-1} \cdots \quad (1)$$

the thermal decomposition of said amine, the formation of ammonia due to the reaction of hydrogen with nitrogen compounds and the reaction causing extraction of nitrogen from the thermal condensation product.

It is generally known that the groups which exist in the N—N form are those listed below.
a. —NHNH$_2$ (hydrazino group)
b. —N=N— (azo group)
c. =N—N= (azino group)
d. —N≡N (diazon group)

The inventors, therefore, conducted an experiment in an effort to determine which one of the foregoing four groups it is that actually exists in the N—N form within the activated carbon.

An infra-red adsorption spectrometry was tried but failed to produce a distinctive spectrum and proved incapable of determination. Then, the pH measurement was performed by directly inserting a pH meter electrode into a pasty mixture (obtained by mixing the activated carbon with water, boiling the resultant mixture for 30 minutes and thereafter allowing the boiled mixture to cool off). The first pasty mixture showed weak alkalinity. As the number of cycles of washing with hot water given to the subsequent aliquots of activated carbon prior to their conversion into pasty mixtures by the same procedure increased, the pH values obtained gradually shifted toward and eventually reached neutrality. This result leads one to the conclusion that the alkalinity was exhibited probably because the alkaline substances (amines) and the colloidal basic carbon formed in the course of the activation with steam were allowed to coexist with the thermal condensation product and that the alkalinity gradually declined because said coexistent components were dissolved or suspended to be removed in consequence of the treatment with hot water.

In view of the structure of the thermal condensation product, it is hardly conceivable that the N—N form nitrogen in the activated carbon of the present invention exists as hydrazino groups. If said N—N form nitrogen does exist as hydrazino group, then one may logically expect the activated carbon to show alkalinity in consideration of the type of reactivity exhibited by any low molecular compound having one hydrazino group. In the pH test, however, the pH values actually obtained gradually shifted toward and eventually reached neutrality as described above. This fact is believed to disprove the assumed presence of hydrazino group therein.

Of the remaining three groups, more promising in the light of the nature of low molecular compounds and other factors are azo group (—N=N—) and azino group (=N—N=). From the aforementioned test results, it is evident that the activated carbon contains the N—N form nitrogen in a much larger percentage than the thermal condensation product. If the formation of azo group or azino group is assumed to account for the larger percentage of N—N form nitrogen, then it is presumably only logical to conclude that the polyacrylonitrile is converted into the thermal condensation product and, in terms of active groups, the nitrile group (—CN) is converted into the pyridine ring to give birth to either an azo group or azino group as a consequence.

The reports published to date indicate that acridine, when heated in the presence of oxygen, produces diacridonyl through the reaction of the following formula: (C. Graebe, K. Lagodzinski Ann., 276, 35 (1893)).

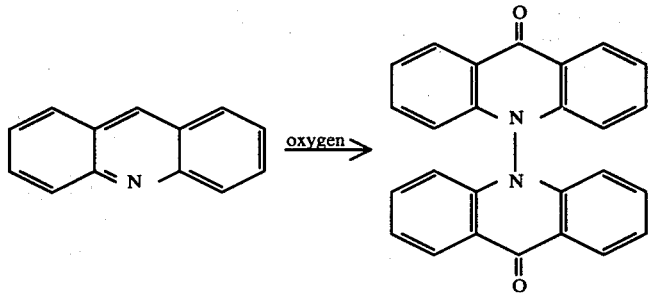

The logical conclusion, therefore, is that the thermal condensation product of polyacrylonitrile has a pyridine ring resembling acridine. Moreover, oxygen also takes part in the reaction in which the thermal condensation product is activated with steam into the activated carbon. There is a fair possibility that, in the course of the activation with steam there occurs a reaction similar to the aforementioned reaction involving the formation of diacridonyl from acrydine. It is, therefore, quite logical that the N—N form nitrogen in the activated carbon exists as azino group. It is not definitely known what enables the N—N link which is not altogether stable thermally to remain intact in the activated carbon notwithstanding the excessively harsh conditions of activation with steam at elevated temperatures under which it is synthesized. This may be accounted for by the ablation effect.

On the other hand, as mentioned earlier the carbon fiber manufactured from polyacrylonitrile as the raw material contains little nitrogen and is a graphite structure, and therefore it is quite different in structure from activated carbon.

Thus, the activated carbon according to the present invention is manufactured by heating the polyacrylonitrile at an elevated temperature (150°–500° C.) and subsequently activating the resultant thermal condensation product.

The manufactured of this activated carbon, therefore, calls for two stages of operation, i.e., the thermal condensation of polyacrylonitrile by exposure to heat and the activation of the resultant thermal condensation product.

For the formation of the thermal condensation product, there can generally be employed any of the known methods. When the formation is effected specifically in the presence of air or an acidic gas, for example, the thermal condensation product can be obtained with enhanced mechanical strength in an improved yield. It is also possible to obtain the thermal condensation product in a desired shape by preparing the polyacrylonitrile in the form of powder, granules, lumps or film in advance or depositing it on a carrier such as fabric and thereafter subjecting the resultant molded polyacrylonitrile to the aforementioned treatment.

In order to obtain a thermal condensation product, it is necessary to heat a substance producing polyacrylonitrile or a copolymer of acrylonitrile as the raw material for producing an activated carbon, at temperatures between 150° C. and 500° C. for 2 minutes to 3 hours in an oxidative gas such as air or a mixture of air and an inert gas.

When the substance is heated at termperatures below 150° C. it is not converted into a thermal condensation product, whereas when the substance is heated at temperatures above 500° C. it is subjected to combustion due to the excess oxidative reaction. The heating time depends upon the temperature and/or the atmosphere and is, for example, about 3 hours at a low temperature and several minutes at a high temperature. The atmosphere described above is indispensable to obtaining a thermal condensation product abundant in heat-resistance. When the heat treatment is carried out in an inert atmosphere it is impossible to obtain a thermally stable condensation product. The thermal condensation product thus obtained has the same shape as that of the raw material, is black and has heat-resistance. Thereafter, the thermal condensation product is activated. Activation is the process of subjecting the product to heat-treatment at temperatures below 1000° C. in an atmosphere such as of steam while preventing the combustion of the product, and is an indispensable process in obtaining an adsorbent having a large surface area.

Activation in the present invention is carried out by heating the thermal condensation product in steam, carbon dioxide or a mixture thereof. In this case, it is necessary to restrict the temperature to a temperature in the range of from 550° C. to 950° C. and the heating time to a period in the range of from 2 minutes to 120 minutes. When the thermal condensation product is subjected to a temperature below 550° C. no desired activation is obtained, whereas when it is subjected to a temperature above 950° C. the yield of activated carbon is considerably reduced. The heating time depends upon the heating temperature and/or the atmosphere. The atmosphere used in the activation treatment serves to subject the thermal condensation product of polyacrylonitrile to proper oxidization treatment so as to obtain a substance having innumerable pores, a very large surface area and a high adsorbing capacity. The activated product of the present invention is further characterized by containing nitrogen. The activated product, i.e. activated carbon, thus obtained may be converted into powder, particulate, pellet, film or fiber form as occasion demands, or may be applied onto a glass fibrous supporter. Further, it may be pulverized or molded. In all forms it is black in appearance.

The activated carbon thus produced is characterized by exhibiting a decidedly higher absorbing property for acidic gases, particularly for mercapto compounds, than the conventional activated carbons produced from coconut shells, coal and other raw materials while permitting adsorption of other substances to an extent equal to or higher than the conventional ounter-types. Thus, it contributes greatly to the disposal of gases of objectionable odor having mercapto compounds and organic acids (such as butyric acid) as principal components and to the treatment of industrial wastes containing heavy metals.

The present invention makes it possible to produce various kinds of activated carbons by varying the raw material and/or the treating conditions. The following are the physical properties of the activated carbons obtained by use of polyacrylonitrile and a copolymer of acrylonitrile as the raw materials.

| Raw material | Polyacrylonitrile | Copolymer of acrylonitrile |
|---|---|---|
| Physical property | | |
| Specific surface area | 500 m$^2$/g ~ 2500 m$^2$/g | 300 m$^2$/g ~ 2500 m$^2$/g |
| M.B. (methylene/ blue decolorization index) | 10 m$^2$/g ~ 800 m$^2$/g | 10 m$^2$/g ~ 800 m$^2$/g |
| I.V. (iodine value) | 400 mg/g ~ 2600 mg/g | 300 mg/g ~ 2800 mg/g |
| Bulk density | 0.39 ~ 0.03 | 0.37 ~ 0.02 |
| Pore radius | 7Å ~ 25Å | 10Å ~ 30Å |
| Capacity for adsorbing mercaptan (calculated as butyl mercaptan) | 100% ~ 4000% | 100% ~ 6000% |

Although the activated carbon of the present invention is related in raw material and first heat treatment to carbon fiber, it is quite different in the second heat treatment. The second heat treatment of the activated carbon relates to an activation treatment and that of the carbon fiber relates to a carbonization treatment. More specifically, the activation treatment in producing an activated carbon is carried out at 550° C.–950° C. in an oxidative atmosphere, such as of steam, carbon dioxide or a mixture thereof. The activated carbon thus obtained contains nitrogen and has innumerable pores and a surface area of several hundred m$^2$/g. On the other hand, the carbonization treatment is carried out at temperatures above 1000° C., preferably about 2000° C., in an inert atmosphere. The carbon fiber thus obtained contains little nitrogen and is a graphite structure of small surface area generally of about 10 m$^2$/g and therefore it possesses little adsorptivity.

The nitrogen contained in the activated carbon of the present invention originates, as described above, in the polyacrylonitrile resin, namely the raw material which is thermally condensed and subsequently activated to give the final product. Thus, the nitrogen content of the activated carbon is not less than 0.5% by weight and not more than 20% by weight, the hydrogen content thereof is not less than 0.5% by weight and not more than 5% by weight and the carbon content is not less than 75% by weight and not more than 99% by weight.

An explanation has been given on this point with respect to the activated carbon which is produced by using polyacrylonitrile as the starting material. Entirely the same concept holds good for the activated carbon which is manufactured by using, as the starting material therefor, a copolymer containing polyacrylonitrile. Only in the case of the copolymer, the nitrogen content in the finally produced activated carbon depends upon the acrylonitrile content of the copolymer. In order that the activated carbon may safely preserve its characteristic nitrogen content, the copolymer to be used as the raw material is required to contain at least 10% by weight of acrylonitrile. In the case of the activated carbon manufactured from such copolymer, the nitrogen content is not less than 0.2% by weight and not more than 20% by weight, the hydrogen content is not less than 0.5% by weight and not more than 10% by weight and the carbon content is not less than 70% by weight and not more than 99.3% by weight respectively.

Examples of the copolymer of acrylonitrile which may be used for the present invention include acrylonitrile, acrylic acid or methacrylic acid, esters thereof, acryl amide, methacryl amide, vinyl acetate, vinyl alcohol, vinyl chloride, vinylidene chloride, vinyl pyridine, vinyl pyrrolidone, hydroxyalkyl acrylate, hydroxyalkyl methacrylates, glycidyl acrylate and glycidyl methacrylate copolymers which generally find widespread application in fibers; synthetic rubbers of a kind such as butadiene-acrylonitrile copolymer (NBS) and acrylonitrile-butadiene-styrene copolymer (ABS resin): copolymers having acrylonitrile grafted to butadiene and butadiene-styrene copolymer; and products such as cyanoethylation product of cellulose obtained by chemically reacting polymer of acrylonitrile with another polymer.

Polyacrylonitriles and acrylonitrile copolymers which are used as the starting material for the manufacture of the activated carbon of the present invention may be in the form of powder, fiber, fabrics, film, etc. The form in which the raw material is to be used is not limited specifically.

Further, the activated carbon according to the present invention can also be obtained by having a suitable, thermally stable carrier such as glass fiber impregnated or coated with such raw material and subjecting the resultant composite to the prescribed treatment.

The activated carbon which is manufactured from any of the raw materials enumerated above possesses similar properties to those exhibited by the activated carbon which is produced by using a polyacrylonitrile polymer as the raw material.

Heretofore there has been proposed a nitrogen-containing activated carbon which is a product obtained by impregnating an ordinary nitrogen-free activated carbon with a nitrogen compound such as, for example, melamine resin. The incorporation of nitrogen effected in the case of this product serves the purpose of enhancing the activated carbon's inherent ability to sequester heavy metals such as copper and yet fails to impart the aforementioned absorbing property which is specifically manifested by the activated carbon of the present invention.

The present invention will be described specifically with reference to working examples thereof, which are solely illustrative and not in the least limitative of the present invention.

EXAMPLE 1

In the air, namely in the presence of oxygen, 50 g of polyacrylonitrile was heated at 250° C. and, after the greater part thereof had been discolored to a black shade, it was maintained at 300° C. for 4 hours. The treatment afforded a thermal condensation product in a yield of about 70%.

Then, the thermal condensation product was activated with steam at 850° C. for 25 minutes, to give rise to an activated carbon after removal from the steam. This activated carbon was measured by the B.E.T. method to have a specific surface area of 640 m$^2$/g. It was found to have an M.B. (methylene blue decolorization index) of 65 mg/g, an I.V. (iodine value) of 615 mg/g and a bulk density of 0.32. It is noted that the value of the specific surface area and that the I.V. are substantially the same. The activated carbon was also found to comprise 2.85% of nitrogen, 0.92% of hydrogen and 96.20% of carbon.

It is generally accepted that the diameter of the smallest pore capable of adsorbing iodine is 10 Å and the diameter of the smallest pore capable of adsorbing methylene blue is 15 Å. In the light of the generally accepted values mentioned above, it is believed that the substance formed by the thermal condensation of polyacrylonitrile is structually a rigid carbide, that during the activation with steam of this thermal condensation product for conversion into an activated carbon, the substance is gradually decomposed to permit occurrence of fine pores of not more than 15 Å in diameter and that, after the specific surface area of the substance has reached the level of about 400 m$^2$/g, it permits occurrence of fine pores of not less than 15 Å in diameter capable of adsorbing methylene blue. The activated carbon in this Example had fine pores of the average radius of 8.5 Å.

As concerns the activation, activation with steam is more effective than that with air. At test showed that the yield by the former was twice as much as that by the latter. A possible reason for this difference in yield is that in the presence of steam, the oxidation occurs under milder conditions.

The physical properties of the activated carbon obtained were substantially the same as those of the activated carbon in consequence of activation with air. The activated carbon was crushed to a particle size finer than 325 mesh and tested for its absorbing capacity. The results were as follows.

One-gram portions of the crushed activated carbon were accurately weighed out and were measured for ratios (%) of adsorption of organic gases, such as benzene, butyl mercaptan, butyric acid and methyl amine (as aqueous 40% solution). For comparison, there are additionally shown the results obtained for the activated carbon produced from coconut shell as the raw material (Y-20 made by Hokuetsu Tanso; 1216.4 m$^2$/g of specific surface area, 264.5 mg/g of M.B. and 1156.3 mg/g of I.V.; Comparative Example 1) and the active carbon produced from bitumen coal (Pittsburgh CAL made by Calgon Company; 1399.6 m$^2$/g of specific surface area, 229.5 mg/g of M.B. and 1212.2 mg/g of I.V.; Comparative Example 2).

|  | Activated carbon by this invention | Comparative Ex. 1 | Comparative Ex. 2 |
|---|---|---|---|
| Benzene | 38.63 | 52.55 | 50.28 |
| Butyl mercaptan ($C_4H_9SH$) | 260.58 | 62.19 | 46.83 |
| Butyric acid ($C_3H_7COOH$) | 35.48 | 28.06 | 24.38 |
| Methyl amine ($CH_3NH_2$) | 37.35 | 51.34 | 44.36 |

The values shown in the preceding table were those obtained on the basis of weight increases. The data on the activated carbon according to the present invention indicate that the adsorption ratio exhibited for butyl mercaptan is exceptionally high and that for butyric acid is also high, while the absorption of methyl amine or benzene is not particularly high. When the crushed activated carbon adsorbed butyl mercaptan, it assumed a pasty state. The pasty mass was stirred with an amount of benzene 50 times as large by weight at room temperature and then filtered. This cycle of washing was repeated until the mass ceased to emit the odor of mercaptan. Thereafter the washed mass was dried at 150° C. for 2 hours. When the dried activated carbon was again allowed to absorb butyl mercaptan, it showed 218.62% of adsorption ratio. This clearly indicates that the activated carbon could be stripped of the adsorbate (gas) by elution with a solvent and, in the resultant regenerated form, could be put to reuse.

The specific adsorbability for butyl mercaptan was as low as 9.34% in the case of the thermal condensate product and it was also notably low in Comparative Example 1 and Comparative Example 2.

In the present example, as described above, the activation was effected with steam at 850° C. for 25 minutes. The activated carbon consequently showed 640 m²/g of specific surface area, 65 mg/g of M.B., 615 mg/g of I.V., 0.32 of bulk density, 8.5 Å of average pore radius and 250.58% of adsorption ratio of butyl mercaptan. When the activation was effected with steam at the same temperature for 45 minutes, the resultant activated carbon showed 1410 m²/g of specific surface area, 385 mg/g of M.B., 1300 mg/g of I.V., 0.22 of bulk density and 25 Å of average pore radius with the ratio of adsorption of butyl mercaptan improved to 340.80%. The activated carbon was found to comprise 1.80% nitrogen, 0.60% hydrogen and 97.4% carbon. The comparison of the data indicates that the absorbing property of the activated carbon, therefore, can be varied to suit the particular purpose of use to which the product is put, by adjusting the temperature and time of the activation treatment with steam.

The aforementioned organic gases on which the indicated activated carbons were tested for adsorption ratio form the principal components of substances which are today posing a serious pollution problem due to their disagreeable odor. No good adsorbent for mercaptans, in particular has so far been available. The activated carbon according to this invention, when used in combination with a sulfonated activated carbon (formulated for adsorption of amines), can manifest an outstanding effect in the prevention of public nuisance due to such disagreeable odor.

The activated carbons were then tested for adsorption of heavy metals. The test was effected by placing 50 mg of a given activated carbon in 50 ml of aqueous solution containing 10 ppm of a given heavy metal, gently shaking the system at 20° C. for 24 hours for thereby allowing the adsorption to reach equilibrium and thereafter measuring the residual metal content of the solution. The results were as follows. The activated carbons used for this test were the same as those tested for adsorption of organic gases.

|  | Amount adsorbed ($\mu g$) | Ratio of adsorption (%) | Amount adsorbed ($\mu g/g$ of activated carbon) |
|---|---|---|---|
| Adsorption of mercury |  |  |  |
| Activated carbon of this invention | 43.57 | 87.14 | 869.17 |
| Comparative Example 1 | 27.50 | 55.00 | 549.45 |
| Comparative Example 2 | 35.71 | 71.42 | 710.87 |
| Adsorption of cadmium |  |  |  |
| Activated carbon of this invention | 43.33 | 86.67 | 862.54 |
| Comparative Example 1 | 45.29 | 90.59 | 905.16 |
| Comparative Example 2 | 36.27 | 72.55 | 724.90 |
| Adsorption of hexavalent chromium |  |  |  |
| Activated carbon of this invention | 42.45 | 84.91 | 846.18 |
| Comparative Example 1 | 13.21 | 26.41 | 264.09 |
| Comparative Example 2 | 50.00 | 100.00 | 999.40 |
| Adsorption of lead |  |  |  |
| Activated carbon of this invention | 43.27 | 86.53 | 863.25 |
| Comparative Example 1 | 39.06 | 78.11 | 777.87 |
| Comparative Example 2 | 42.85 | 85.69 | 855.87 |

From the foregoing results, it is evident that the activated carbon according to the present invention provides substantially the same degree of adsorption of these heavy metals as the conventional countertypes.

EXAMPLE 2

In the air, 25 g of acrylonitrile-methyl acrylate (95:5 in weight ratio) in the form of fabric was heat treated at 180° C. for 2 hours and then at 270° C. for 5 hours, to give rise to 23 g of a black thermal condensation product in the form of a fabric. This fabric was subjected to activation in the current of steam gas at 900° C. for 4 hours to afford a brittle fabric of activated carbon. This activated carbon was measured to have 580 m²/g of specific surface area (by B.E.T. method), 16 mg/g of M.B., 608 mg/g of iodine value, 0.03 of bulk density and 8.0 Å of average pore radius. It exhibited 208% of saturated adsorption for ethyl mercaptan. The composition of the activated carbon obtained consisted of 3.18% nitrogen, 1.11% hydrogen and 95.70% carbon.

EXAMPLE 3

An acrylonitrile-vinyl acetate (97:3 in weight ratio) copolymer was dissolved in dimethyl formamide to a concentration of 5%. A glass fabric was coated with this solution several times to form a glass fiber-copolymer composite. This composite was subjected first to the heating treatment and then to the activation treatment similarly to those of Example 2, to give birth to a glass fiber-activated carbon composite which was measured to have 102 m²/g of specific surface area, 0.34 of bulk density of activated carbon portion, 10 Å of average pore radius, 98 mg/g of iodine value and 8.2 mg/g of M.B. It provided 19% of adsorption of isobutyl mercaptan. Although the specific surface area of the composite as a whole was small as described above. When calculated from the amount of acrylonitrile copolymer deposited on the glass fiber, however, the specific surface area of the activated carbon portion of the composite amount to 1480 m²/g. The activated carbon was found to have 125 mg/g of M.B., 1400 mg/g of I.V. and 300% of adsorption ratio of butyl mercaptan. The composition of the activated carbon consisted of 0.91% nitrogen, 0.5% hydrogen and 98.60% carbon.

EXAMPLE 4

The thermal condensation product obtained in Example 1 was activated with steam at 600° C. for 300 minutes to obtain an activated carbon. The activated carbon was found to show 800 m²/g of specific surface area, 200 mg/g of M.B., 780 mg/g of I.V., 0.3 of bulk density, 8.5 Å of average pore radius and 220% of adsorption ratio of butyl mercaptan, and to comprise 0.6% of hydrogen and 0.95% of nitrogen, the remainder being carbon.

EXAMPLE 5

The black thermal condensation product of fabric form obtained in Example 2 was activated with carbon dioxide at 550° C. for 400 minutes to obtain an activated carbon in the form of a fabric. The activated carbon was found to show 750 m²/g of specific surface area, 190 mg/g of M.B., 770 mg/g of I.V., 0.03 of bulk density, 8 Å of average pore radius and 220% of adsorption ratio of butyl mercaptan, and to comprise 0.6% of hydrogen and 0.99% of nitrogen, the remainder being carbon.

COMPARATIVE EXAMPLE 3

The thermal condensation product obtained in Example 1 was activated by the same procedures as in Example 4 except that the temperature was 1000° C. to obtain a carbon material. The carbon material was found to show 10 m²/g of specific surface area, 3 mg/g of M.B., 5 mg/g of I.V., 0.34 of bulk density, few pores and 2-3% of adsorption of butyl mercaptan, and to comprise 0.35% of hydrogen, 3% of nitrogen, the remainder being carbon.

COMPARATIVE EXAMPLE 4

The black thermal condensation product of fabric form obtained in Example 2 was activated by the same procedures as in Example 5 except that the temperature was 1000° C. to obtain a carbon material. The carbon material was found to show 8 m²/g of specific surface area, 2 mg/g of M.B., 2.8 mg/g of I.V., 0.032 of bulk density, few pores and 3% of adsorption of butyl mercaptan, and to comprise 0.33% of hydrogen and 2.8% of nitrogen, the remainder being carbon.

What is claimed is:

1. A method of manufacturing activated carbon which comprises:
   (a) thermally condensing a polymer of acrylonitrile at a temperature between 150° and 500° C. for 3 hours to 2 minutes in an oxidizing atmosphere until a black condensation product is formed;
   (b) heating said product at 550° to 950° C. in an atmosphere consisting essentially of at least one member of the group consisting of steam and carbon dioxide until an activated carbon capable of absorbing butyl mercaptan in an amount of more than 100% of the weight of said activated carbon is formed; and
   (c) recovering said activated carbon.

2. A method as set forth in claim 1, wherein said activated carbon contains 0.2 to 20% nitrogen, 0.5 to 10% hydrogen, the balance consisting essentially of carbon.

3. A method as set forth in claim 2, wherein said polymer is polyacrylonitrile, said activated carbon containing at least 0.5% nitrogen, and not more than 5% hydrogen.

4. A method as set forth in claim 2, wherein said polymer is a copolymer of at least 10% acrylonitrile with at least one member of the group consisting of acrylic acid, acrylic ester, methacrylic acid, methacrylic ester, acrylamide, methacrylamide, vinyl acetate, vinyl alcohol, vinyl chloride, vinylidene chloride, vinyl pyridine, vinyl pyrrolidone, hydroxyalkyl acrylate, hydroxyalkyl methacrylate, glycidyl acrylate, glycidyl methacrylate, butadiene, butadienestyrene copolymer and cyanoethylation product of cellulose.

5. An activated carbon containing 0.2 to 20% nitrogen, 0.5 to 10% hydrogen, the balance consisting essentially of carbon, said activated carbon being capable of absorbing butyl mercaptan in an amount of more than 100% of the weight thereof, having a specific surface area of 300 to 2500 m²/g, a methylene blue decolorization index of 10 to 800 mg/g, an iodine value of 300 to 2800 mg/g, and a bulk density of 0.02 to 0.39.

6. An activated carbon as set forth in claim 5 produced by thermally condensing a polymer of acrylonitrile at a temperature between 150° and 500° C. for 3 hours to 2 minutes in an oxidizing atmosphere until a black condensation product is formed, and by heating said product at 550° to 950° in an atmosphere consisting essentially of at least one member of the group consisting of steam and carbon dioxide.

* * * * *